Patented July 24, 1951

2,562,117

UNITED STATES PATENT OFFICE 2,562,117

POLYTETRAFLUOROETHYLENE COATING COMPOSITIONS

Le Verne Kenneth Osdal, Upper Darby, Pa., assignor to E. I. du Pont de Nemours and Company, Wilmington, Del., a corporation of Delaware No Drawing. Application July 8, 1949,
Serial No. 103,747

5 Claims. (Cl. 260—29.6)

This invention relates to coating compositions and, more particularly, to coating compositions containing polytetrafluoroethylene.

U. S. Patent No. 2,230,654 describes a method of preparing polytetrafluoroethylene. Copending application Serial No. 713,385, filed November 30, 1946, by Malcolm M. Renfrew, now U. S. Patent No. 2,534,058, discloses a method of preparing aqueous suspensoids of polytetrafluoroethylene, and copending applications Serial No. 695,059, filed September 5, 1946, by Kenneth L. Berry, now U. S. Patent No. 2,478,229, and Serial No. 783,389, filed October 31, 1947, by Carol K. Ikeda, now abandoned, disclose methods of concentrating such suspensoids.

Films of polytetrafluoroethylene may be prepared by applying such aqueous suspensoids to suitable substrates and baking at or above the fusion temperature of the polymer (621° F.). However, apparently due to the waxy character of the polymer, such films do not possess a satisfactory degree of adhesion, according to paint, varnish, and enamel standards, when applied to relatively non-porous surfaces such as metal, glass, and ceramics. It has been found that preliminary treatments and surface transformations, such as "Bonderizing" and sandblasting, somewhat improve the adhesion of these polytetrafluoroethylene films, but the degree of adhesion is still not comparable to that of films of conventional organic coating compositions.

It is, therefore, a principal object of this invention to provide a liquid coating composition containing polytetrafluoroethylene which, when applied to a substrate and fused into a continuous film, possesses a degree of adhesion to substrates which is comparable to that of conventional organic films.

Another object is to provide a liquid coating composition containing polytetrafluoroethylene which possesses excellent adhesion to substrates and which is suitable for use as a base or primer coat for a succeeding coat or coats of other polytetrafluoroethylene-containing compositions and/or other organic coatings.

Other objects will become apparent as the description proceeds.

These objects are accomplished by incorporating chromic acid in an aqueous suspensoid of polytetrafluoroethylene.

The term "chromic acid," as used herein, is intended to include chromic anhydride (chromium trioxide, $CrO_3$) and the hypothetical substance $H_2CrO_4$, and references to quantities of chromic acid are expressed in terms of the equivalent anhydride ($CrO_3$).

In a preferred embodiment of this invention, a relatively concentrated aqueous suspensoid of polytetrafluoroethylene is diluted with a pre-determined quantity of water and wetting agent. The mixture is agitated to maintain uniformity and prevent coagulation or precipitation of the polymer. In a separate vessel, a predetermined quantity of chromic acid and water are mixed until a solution is formed, and this solution is then added slowly to the diluted suspensoid while agitation is continued.

The following examples illustrate embodiments of this invention and are given by way of illustration only:

EXAMPLE 1

*Mixture A*

| | Parts by weight |
|---|---|
| Polytetrafluoroethylene suspensoid | 100.0 |
| Water | 54.8 |
| | 154.8 |

The polytetrafluoroethylene suspensoid had the following composition:

| | Per cent |
|---|---|
| Finely divided polytetrafluoroethylene | 50.0 |
| Sodium salt of the sulphuric acid ester of a mixture of long chain alcohols (predominantly lauryl alcohol) | 0.5 |
| Water | 49.5 |

Mixture A was prepared by adding the ingredients while agitating with a mechanical mixer.

*Mixture B*

| | Parts by weight |
|---|---|
| Chromic acid | 41.0 |
| Water | 23.8 |
| | 64.8 |

The ingredients of Mixture B were mixed until clear and uniform and then added to Mixture A with continued agitation. Stirring was stopped when the two mixtures were thoroughly blended and substantially homogeneous.

The chromic acid constituted 45% by weight, based on the combined polymer and chromic acid content, and 18.5% of the resulting composition, which had a solids concentration of approximately 41%.

The composition was strained and applied to bare, clean, lightly sanded aluminum and steel panels which were then baked in an electrically heated oven at 750° F. for 5 minutes.

The films on all panels were approximately 0.5 mil thick.

The film produced by the composition of this example was smooth, tough, and waxy, it was somewhat opaque and green in color, and its adhesion was excellent, requiring a sharp knife to scrape it away from the metal. Repeated bending resulted in no local loss of adhesion.

Similar panels were coated with polytetrafluoroethylene of practically the same solids content but containing no chromic acid. The film of this composition was smooth, tough, waxy, and relatively transparent, but possessed so little adhesion to the metal that it could be stripped therefrom by pulling with the fingers.

EXAMPLE 2

One panel of each of the following:
Aluminum           Cadmium Plated Steel
Hot Rolled Steel   Galvanized Steel
Cold Rolled Steel  Silver
Stainless Steel    Copper
Bonderized Steel was cleaned and lightly sanded. One-half of the surface of each panel was prime-coated with the composition of Example 1 and baked in an oven at 750° F. for 7 minutes.

After cooling, the entire surface (primed and unprimed portions) of each panel was coated with about 0.5 mil (dry thickness) of the following composition:

|   | Percent |
|---|---|
| Finely divided polytetrafluoroethylene | 50.0 |
| Sodium salt of the sulphuric acid ester of a mixture of long chain alcohols (predominantly lauryl alcohol) | 0.5 |
| Water | 49.5 |

The panels were again baked in an oven at 750° F. for 5 minutes to fuse the polymer into a continuous film.

The top film on each panel was loosened and could be easily stripped from the unprimed portion of the panel. However, when the stripped film reached the edge of the primed portion, the force required for stripping increased sharply and the film stretched considerably or broke before adhesion was lost at the metal interface or the topcoat interface.

In additional similar tests, it was observed that the adhesion of the primer to the copper panel was not as good as to the other metals, but the priming coat always had considerably better adhesion than the polymer film containing no chromic acid.

EXAMPLE 3

An anodized aluminum control panel (4" x 12") was cleaned and lightly sanded and then coated with a polytetrafluoroethylene suspensoid of the same composition as that used for the topcoat in Example 2. The coated panel was then baked in an oven at 750° F. for 5 minutes to fuse the polymer. The resulting film thickness was 0.7 mil.

Additional anodized aluminum panels (4" x 12") were cleaned and lightly sanded and a 1" x 2" strip along one edge of each of the panels was primer coated with one of the compositions listed in the table below. These compositions were made and baked according to the procedure set forth in Example 1.

The primer film thickness (dry) was about 0.3 mil in each case. A film of the polytetrafluoroethylene suspensoid used for the topcoat in Example 2 having a thickness of 0.7 mil (dry) was applied over the entire face of each of the panels and baked in an oven at 750° F. for about 5 minutes.

All of the panels were cooled and cut into one-inch strips across the width to produce several 1" x 4" test sections. The partially primed panels thus had three inches coated with the polytetrafluoroethylene topcoat over the bare metal and one inch coated with the same topcoat over the primed portion.

The film on each panel was stripped for about one inch at the unprimed end and clamped in the lower jaws of a Scott tester, model X-2. The resulting bare portion of the metal test panel was clamped in the upper jaws. As the jaws moved apart the film was pulled from the panel at an angle of substantially 180° (i. e., the peeled portion was pulled back over the unpeeled portion).

The test sections of the control panel coated with the polytetrafluoroethylene suspensoid composition containing no chromic acid, when tested as described in the preceding paragraph, showed that an average pull of 0.6 pound was required to destroy the adhesion of the film to the metal surface; i. e., to peel the film from the panel.

The following table gives values for the adhesion of the compositions of this invention to metal:

TABLE I

| Composition of metal priming coat (Parts by weight) | | | | (a) | (b) |
|---|---|---|---|---|---|
| Polytetrafluoroethylene | Chromic Acid | Duponol ME [1] | Water | Pounds pull required to destroy adhesion | Adhesion factor [2] |
| 99 | 1  | .99  | 100 | 3.0     | 5.0    |
| 90 | 10 | .90  | 100 | 6.5     | 10.8   |
| 75 | 25 | .75  | 100 | [3] >7.2 | >12.0 |
| 65 | 35 | .65  | 100 | [3] >6.7 | >11.2 |
| 55 | 45 | .55  | 100 | [3] >7.0 | >11.7 |
| 45 | 55 | .45  | 100 | [3] >7.0 | >11.7 |
| 35 | 65 | 3.00 | 100 | 6.7     | 11.2   |
| 25 | 75 | 3.00 | 100 | 3.3     | 5.5    |
| 10 | 90 | 1.75 | 100 | 3.7     | 6.2    |

[1] Sodium salt of the sulphuric acid ester of a mixture of long chain alcohols (predominantly lauryl alcohol).
[2] Column (a) over 0.6 (control).
[3] Film ruptured during test.

The values in column (a) of Table I are the pounds required to strip the topcoat from the surface of the primer or to peel the adherent topcoat-primer system from the metal. The values are averages for several test sections cut from each panel and are representative of the improvements embodied in this invention over a wide range of ratios of polymer, chromic acid, water, wetting agent, and total solids.

It will be understood that the particular wetting or dispersing agents shown in the above examples form no part of this invention and any suitable means for maintaining uniform dispersion of the polytetrafluoroethylene particles may be employed.

In the compositions of this invention, any wetting or dispersing agent may be used, providing it is stable in the presence of the other ingredients. The wetting agent concentrations shown are not critical, but controlled amounts are helpful in adjusting the final composition to yield optimum stability, application properties, appearance, and performance. Concentrations as high as 16% total wetting agent have been used.

Polymeric materials, such as polychlorotrifluoroethylene, or those containing preponderant amounts of polytetrafluoroethylene, such as copolymers of tetrafluoroethylene with other polymerizable materials, are operable provided they are stable in the presence of the other ingredients of the compositions of this invention.

When such a copolymer is used in the practice of this invention, it is preferred to use a copolymer of tetrafluoroethylene and ethylene and particularly one which contains from 60% to 85% of tetrafluoroethylene and 40% to 15% of ethylene.

The solids concentration (total polymer and chromic acid) of the final composition may vary over a wide range. A 15% solids composition deposits relatively thin films, and several coats are required in order to build up a film of normal thickness. A 40% solids composition is easily handled and produces continuous films of reasonable thickness in one coat. A 60% solids composition is usable where higher consistency can be employed.

The polymer concentration may also vary over a wide range, but it is desirable to keep it below about 75% of the total composition in order to avoid coagulation, precipitation, or "kick out."

The total amount of chromic acid should be within the range of 1% to 90% of the combined polymer and chromic acid content, and the preferred range is from 10% to 70%.

If desired, modifying agents, such as pigments, fillers, organic solvents, and other film-forming materials, may be added (provided they are compatible with and stable in the presence of the other ingredients), and they are useful in imparting color or enhancing hiding power or providing other properties to the compositions of this invention.

When applying the compositions of this invention to ferrous metal substrates, it is often advantageous to incorporate zinc phosphate dissolved in the chromic acid solution.

These compositions may be applied by any suitable means to any substrate capable of withstanding the high temperature required for fusing the polytetrafluoroethylene particles into a continuous film.

The polymer temperature at which fusion of polytetrafluoroethylene occurs is about 621° F., but that of a copolymer is somewhat less depending on the proportion and fusion point of the modifying material present. The maximum allowable temperature for either type of polymeric material is just short of that at which undesirable decomposition occurs (approximately 930° F., for the polytetrafluoroethylene).

The duration of the baking process varies over a wide range, depending on the method of heating, thermal properties of the substrate, and heat transfer conditions. The criterion is the fusion temperature of the polymer and maintenance of the polymer at this temperature for the period necessary to form a continuous film. The source of the heat is not critical, and it may be, for instance, infra red rays, hot air heated by combustion or by electricity, or direct flame.

When a composition of this invention has been applied and baked as described, the resulting film adheres tenaciously to the substrate to a degree not previously possible with known polytetrafluoroethylene coating compositions. Furthermore, the adhesion is comparable to that of conventional synthetic organic enamels of the type commonly used on automobile bodies, refrigerator cabinets, and furniture.

The compositions of this invention are useful to improve adhesion in all cases where liquid coating compositions containing polytetrafluoroethylene are employed on relatively non-porous substrates and permit the use of polytetrafluoroethylene in a manner similar to conventional liquid coating compositions. These uses include coating glass, ceramics, and metals (foil sheets, wires, and cast or formed shapes) where the anti-sticking properties, electrical properties, chemical resistance, or high temperature resistance of polytetrafluoroethylene are essential. These compositions are also useful in impregnating glass fibers or glass cloth and in cementing them to substrates, such as metal foil. The adhesion of massive polytetrafluoroethylene (as in preformed sheets) to relatively non-porous substrates is also improved when the compositions of this invention are used as an intermediate adhesive layer.

These compositions are particularly useful in the manufacture of greaseless bread pans, muffin tins, and cookie sheets; coated ceramic spark plug insulators; metal reaction vessels exposed to corrosive substances at high temperatures; glass or metal acid containers; electrical apparatus subject to heat, chemicals, solvents, and exhaustive electrical conditions; and anti-sticking metal molds for rubber products.

They have been found particularly useful for coating the "hot spinners" in the bookbinding apparatus described in copending application Serial No. 44,144, filed August 13, 1948, by Robert E. Fogg and Harry J. Haon, now abandoned.

It is apparent that many widely different embodiments of this invention can be made without departing from the spirit and scope thereof; and, therefore, it is not intended to be limited except as indicated in the appended claims.

I claim:
1. A coating composition comprising 10–99% of polytetrafluoroethylene and 1–90% of chromic acid based on the combined polytetrafluoroethylene and chromic acid content.

2. A coating composition comprising chromic acid and an aqueous suspensoid of polytetrafluoroethylene, the chromic acid constituting 1–90% of the combined chromic acid and polytetrafluoroethylene content.

3. The coating composition of claim 2 in which the chromic acid constitutes 10–70% based on the combined polymer and chromic acid content.

4. The coating composition of claim 2 in which the solids concentration of the total composition is about 50%.

5. A coating composition comprising chromic acid, zinc phosphate, and an aqueous suspensoid of polytetrafluoroethylene, the chromic acid constituting 1–90% of the combined chromic acid and polytetrafluoroethylene content.

LE VERNE KENNETH OSDAL.

REFERENCES CITED

The following references are of record in the file of this patent:

UNITED STATES PATENTS

| Number | Name | Date |
|---|---|---|
| 2,385,800 | Douty et al. | Oct. 2, 1945 |
| 2,483,835 | Manzer | Oct. 4, 1949 |

Certificate of Correction

Patent No. 2,562,117

July 24, 1951

LE VERNE KENNETH OSDAL

It is hereby certified that error appears in the printed specification of the above numbered patent requiring correction as follows:

Column 2, lines 3 and 4, for "pre-determined" read *predetermined*; column 3, line 3, for "gfreen" read *green*; lines 65 and 66, for "a 1″ x 2″ strip" read *a 1″ x 12″ strip*;

and that the said Letters Patent should be read as corrected above, so that the same may conform to the record of the case in the Patent Office.

Signed and sealed this 18th day of September, A. D. 1951.

[SEAL]

THOMAS F. MURPHY,
*Assistant Commissioner of Patents.*